(12) United States Patent
Janardhana et al.

(10) Patent No.: US 11,361,554 B2
(45) Date of Patent: Jun. 14, 2022

(54) PERFORMING OBJECT AND ACTIVITY RECOGNITION BASED ON DATA FROM A CAMERA AND A RADAR SENSOR

(71) Applicant: Robert Bosch GmbH, Stuttgart (DE)

(72) Inventors: Rajani Janardhana, San Jose, CA (US); Krishna Mohan Chinni, Canton, MI (US)

(73) Assignee: Robert Bosch GmbH, Stuttgart (DE)

(*) Notice: Subject to any disclaimer, the term of this patent is extended or adjusted under 35 U.S.C. 154(b) by 444 days.

(21) Appl. No.: 16/660,557

(22) Filed: Oct. 22, 2019

(65) Prior Publication Data
US 2021/0117701 A1    Apr. 22, 2021

(51) Int. Cl.
| | |
|---|---|
| *G06K 9/00* | (2022.01) |
| *G06V 20/58* | (2022.01) |
| *G01S 13/931* | (2020.01) |
| *G05D 1/02* | (2020.01) |
| *G05D 1/00* | (2006.01) |
| *G06K 9/62* | (2022.01) |
| *G01S 13/89* | (2006.01) |

(52) U.S. Cl.
CPC ............ *G06V 20/58* (2022.01); *G01S 13/89* (2013.01); *G01S 13/931* (2013.01); *G05D 1/0088* (2013.01); *G05D 1/0246* (2013.01); *G06K 9/6267* (2013.01)

(58) Field of Classification Search
CPC .......... G01S 7/412; G01S 7/417; G01S 13/89; G06K 9/6267; G06K 9/00671; G06K 9/00805; H04L 63/107; G06T 7/579; G06T 19/006; G06T 7/73; G06T 7/10; G05D 1/0088

USPC ............................................ 382/103; 342/52
See application file for complete search history.

(56) References Cited

U.S. PATENT DOCUMENTS

| | | | |
|---|---|---|---|
| 9,604,639 B2 | 3/2017 | Laur et al. | |
| 9,604,649 B1 | 3/2017 | Pastor et al. | |
| 10,139,833 B1 | 11/2018 | Zeng et al. | |
| 2018/0137373 A1* | 5/2018 | Rasmusson, Jr. | G06V 20/56 |
| 2018/0374235 A1 | 12/2018 | Kamata et al. | |
| 2019/0011534 A1* | 1/2019 | Trotta | G01S 13/89 |

(Continued)

OTHER PUBLICATIONS

German Patent Office Action for Application No. 102020212799.9 dated Sep. 22, 2021 (11 pages including machine translation).

(Continued)

*Primary Examiner* — Phuoc H Doan
(74) *Attorney, Agent, or Firm* — Michael Best & Friedrich LLP

(57) ABSTRACT

A system for performing object and activity recognition based on data from a camera and a radar sensor. The system includes a camera, a radar sensor, and an electronic processor. The electronic processor is configured to receive an image from the camera and determine a portion of the image including an object. The electronic processor is also configured to receive radar data from the radar sensor and determine radar data from the radar sensor associated with the object in the image from the camera. The electronic processor is also configured to convert the radar data associated with the object to a time-frequency image and analyze the time-frequency image and the image of the object to classify the object and an activity being performed by the object.

18 Claims, 5 Drawing Sheets

(56) References Cited

U.S. PATENT DOCUMENTS

2019/0050692 A1   2/2019   Sharma et al.
2019/0065878 A1   2/2019   Zeng et al.
2019/0114507 A1   4/2019   Chiu et al.

OTHER PUBLICATIONS

Angelov et al., "Practical classificaiton of different moving targets using automotive radar and deep neural networks", IET Radar, Sonar & Navigation, vol. 12, No. 10, 2018, 8 pages.

De Jong et al., "Radar and Video Multimodal Learning for Human Activity Classification", IEEE International Radar Conference, 2019, 6 pages.

Kocic et al., "Sensors and sensor fusion in autonomous vehicles", IEEE 26th Telecommunications Forum, 2018, pp. 420-425.

Zhou et al., "Fall detection using convolutional neural network with multi-sensor fusion", IEEE International Conference an Multimedia & Expo Workshops, 2018, 5 pages.

* cited by examiner

PERFORMING OBJECT AND ACTIVITY RECOGNITION BASED ON DATA FROM A CAMERA AND A RADAR SENSOR

FIELD

Embodiments relate to object detection and recognition.

BACKGROUND

Modern vehicles include various partially autonomous driving functions, for example adaptive cruise-control, collision avoidance systems, self-parking, and the like. Fully autonomous driving is a goal, but has not yet been achieved, at least on market-ready, commercially-viable scale.

SUMMARY

In order to achieve fully autonomous driving, improvements in object and activity classification are needed. Classifying objects and the activities that those objects are performing allows a vehicle to perform an autonomous driving function based on the vehicle's surrounding environment. In one example, a vehicle may classify an object in its surrounding environment as a neighboring vehicle and the activity that the neighboring vehicle is performing as a lane merger in front of the vehicle. In response to detecting that a neighboring vehicle is merging in front of the vehicle, the vehicle may slow down to allow the neighboring vehicle to merge. In another example, a vehicle may detect that an object in the vehicle's surrounding environment is a pedestrian and the activity that the pedestrian is performing is crossing the street in front of the vehicle. In response to detecting that a pedestrian is crossing the street in front of the vehicle, the vehicle may slow down or stop.

Currently, many systems that perform object and activity recognition do so using radar data from radar sensors. Radar sensors are, in general, robust and provide accurate data about a vehicle's surrounding environment in many situations and weather conditions. In existing systems, object location and velocity information can be determined from input received from radar sensors, but classifying the type of object, using radar alone, is difficult.

There are also many current systems that utilize image data from a camera to perform object and activity classification. While classifying objects using image data in ideal conditions is not difficult, image data is less reliable in non-ideal conditions (for example, rainy or snowy weather). Additionally, determining velocity information for an object with image data is difficult.

Therefore, embodiments herein describe, among other things, a system and method for performing object and activity recognition based on data from a camera and a radar sensor. Providing both radar data from a radar sensor and image data from a camera simultaneously to a neural network allows for a more accurate classification of objects in the vehicle's surrounding environment as well as the activities that the objects are performing.

For example, one embodiment provides a system for performing object and activity recognition based on data from a camera and a radar sensor. The system includes a camera, a radar sensor, and an electronic processor. The electronic processor is configured to receive an image from the camera and determine a portion of the image including an object. The electronic processor is also configured to receive radar data from the radar sensor and determine radar data from the radar sensor associated with the object in the image from the camera. The electronic processor is also configured to convert the radar data associated with the object to a time-frequency image and analyze the time-frequency image and the image of the object to classify the object and an activity being performed by the object.

Another embodiment provides a method for performing object and activity recognition based on data from a camera and a radar sensor. The method includes receiving, with an electronic processor, an image from a camera and determining, with the electronic processor, a portion of the image including an object. The method also includes receiving, with the electronic processor, radar data from a radar sensor and determining, with the electronic processor, radar data from the radar sensor associated with the object in the image from the camera. The method further includes converting, with the electronic processor, the radar data associated with the object to a time-frequency image and analyzing, with the electronic processor, the time-frequency image and the image of the object to classify the object and an activity being performed by the object.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components.

Figure 1:
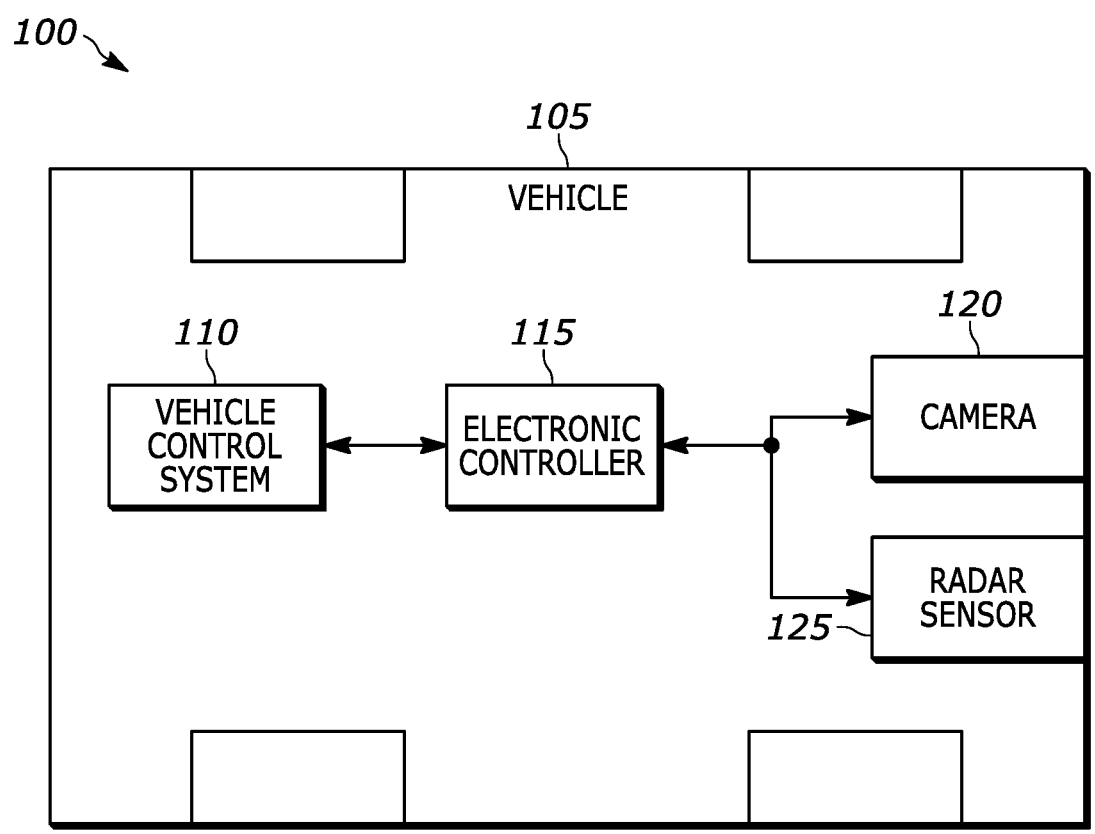
FIG. 1 is a block diagram of a system for performing object and activity recognition based on data from a camera and a radar sensor according to one embodiment.

FIG. 1 illustrates a system 100 for performing object and activity recognition based on data from a camera and a radar sensor. In the example provided, the system 100 includes a vehicle 105. The vehicle 105, although illustrated as a four-wheeled vehicle, may encompass various types and designs of vehicles. For example, the vehicle 105 may be an automobile, a motorcycle, a truck, a bus, a semi-tractor, and others. The vehicle 105 includes at least some autonomous functionality, but may also require a driver or operator to perform driving functions.

In the example illustrated, the vehicle 105 includes several hardware components including a vehicle control system 110, an electronic controller 115, a camera 120, and a radar sensor 125. There may be more than one of each of the camera 120 and radar sensor 125 and they may be located at different positions on the interior or exterior of the vehicle 105. For example, the camera 120, or components thereof, may be externally mounted to a portion of the vehicle 105 (such as on a side mirror or a trunk door). Alternatively the camera 120, or components thereof, may be internally mounted within the vehicle 105 (for example, positioned by the rearview mirror). Preferably, the camera 120 and the radar sensor 125 have aligned fields of view (for example, fields of view with the same center point). In some embodiments, to ensure that the camera 120 and the radar sensor 125 have aligned fields of view, the camera 120 and the radar sensor 125 are mounted at adjacent positions on the vehicle 105 and orientated in the same direction. In other embodiments, the camera 120 and the radar sensor 125 are mounted at substantially different positions on the vehicle 105 and orientated so that they have aligned fields of view.

The electronic controller 115 may be communicatively connected to the vehicle control system 110, camera 120, and radar sensor 125 via various wired or wireless connections. For example, in some embodiments, the electronic controller 115 is directly coupled via a dedicated wire to each of the above-listed components of the vehicle 105. In other embodiments, the electronic controller 115 is communicatively coupled to one or more of the components via a shared communication link such as a vehicle communication bus (for example, a controller area network (CAN) bus) or a wireless connection. It should be understood that each of the components of the vehicle 105 may communicate with the electronic controller 115 using various communication protocols. The embodiment illustrated in FIG. 1 provides but one example of the components and connections of the vehicle 105. Thus, the components and connections of the vehicle 105 may be constructed in other ways than those illustrated and described herein.

Figure 2:
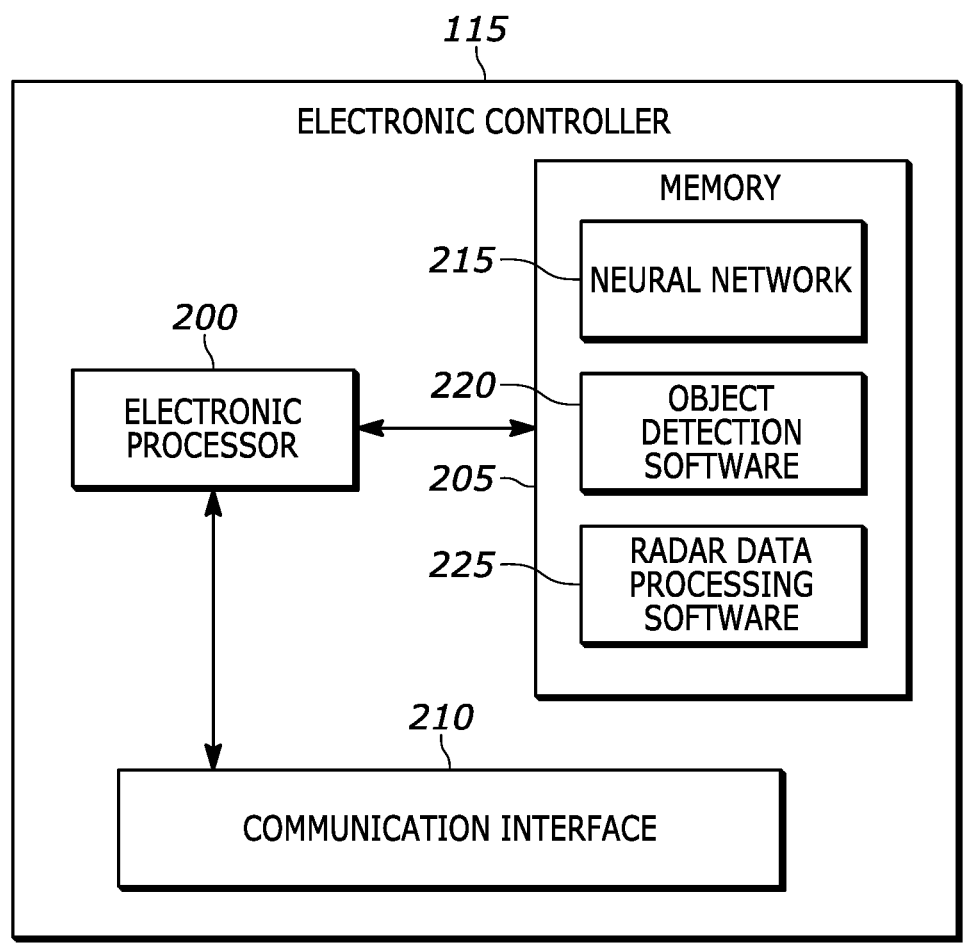
FIG. 2 is a block diagram of an electronic controller of the system of FIG. 1 according to one embodiment.

FIG. 2 is a block diagram of one example embodiment of the electronic controller 115 of the system 100 of FIG. 1. The electronic controller 115 includes a plurality of electrical and electronic components that provide power, operation control, and protection to the components and modules within the electronic controller 115. The electronic controller 115 includes, among other things, an electronic processor 200 (such as a programmable electronic microprocessor, microcontroller, or similar device), a memory 205 (for example, non-transitory, machine readable memory), and a communication interface 210. The electronic processor 200 is communicatively connected to the memory 205 and the communication interface 210. The electronic processor 200, in coordination with the memory 205 and the communication interface 210, is configured to implement, among other things, the methods described herein.

The electronic controller 115 may be implemented in several independent controllers (for example, programmable electronic controllers) each configured to perform specific functions or sub-functions. Additionally, the electronic controller 115 may contain sub-modules that include additional electronic processors, memory, or application specific integrated circuits (ASICs) for handling communication functions, processing of signals, and application of the methods listed below. In other embodiments, the electronic controller 115 includes additional, fewer, or different components.

Figure 4:
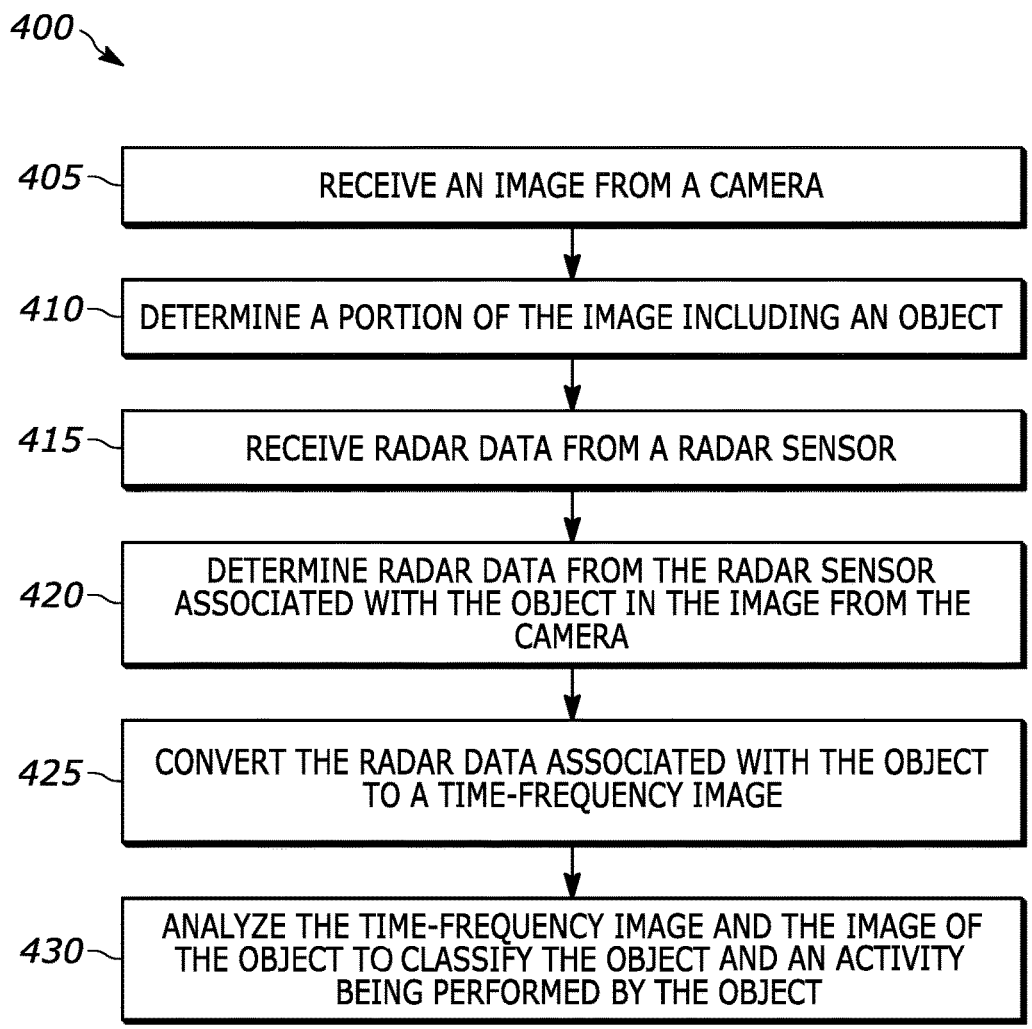
FIG. 4 is a flowchart of a method of using the system of FIG. 1 to perform object and activity recognition based on data from a camera and a radar sensor according to one embodiment.

The memory 205 of the electronic controller 115 includes software that, when executed by the electronic processor 200, causes the electronic processor 200 to perform the method 400 illustrated in FIG. 4. For example, the memory 205 illustrated in FIG. 2 includes a neural network 215, object detection software 220, and radar data processing software 225. The neural network 215 may be a deep neural network (for example, a convolutional neural network (CNN) or a recurrent neural network (RNN)). In one example, the neural network 215 includes two input channels, allowing the neural network 215 to analyze both image data and radar data simultaneously to classify an object in the vehicle's surrounding environment and an action being performed by the object. In some embodiments, the neural network 215 may include a different number of channels than two channels illustrated and described herein. For example, the neural network 215 may include a third channel, allowing the neural network 215 to analyze, for example, lidar data in addition to the image data and radar data. In some embodiments, the neural network 215 is trained to classify objects and the actions that they are performing. In one example, the training is performed using a training set of a plurality of pairs of images. A first image in each pair of images included in the training set may be an image of an object from a camera. A second image in each pair of images may be a time-frequency image based on radar data associated with the object. In some embodiments, the electronic processor 200, when executing the object detection software 220, uses machine learning techniques to detect, in an image received from the camera 120, objects that may impact the movement of the vehicle 105. For example, the object detection software 220 may include a convolutional neural network that has been trained to recognize vehicles, people, animals, a combination of the foregoing, and the like. The electronic processor 200, when executing the radar data processing software 225, determines radar data from the radar sensor 125 that is associated with an object detected in an image from the camera 120 using the object detection software 220. When radar data associated with an object in the image data from the camera 120 is determined, the radar data is converted to a time-frequency image using time-frequency analysis techniques such as a Short Term Fourier Transform (STFT), wavelets, or the like.

Figure 3:
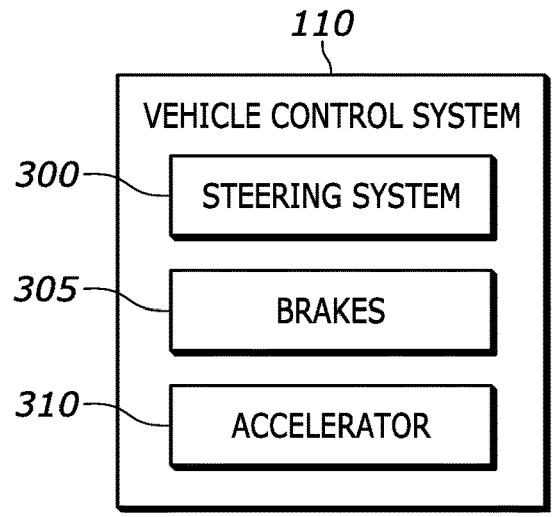
FIG. 3 is a block diagram of a vehicle control system included in a vehicle of the system of FIG. 1 according to one embodiment.

FIG. 3 illustrates an example of the vehicle control system 110. The vehicle control system 110 includes components involved in the autonomous or manual control of the vehicle 105. For example, in some embodiments, the vehicle control system 110 includes a steering system 300, brakes 305, and an accelerator 310. The embodiment illustrated in FIG. 3 provides but one example of the components of the vehicle control system 110. In other embodiments, the vehicle control system 110 includes additional, fewer, or different components.

FIG. 4 illustrates an example method 400 of performing object and activity recognition based on data from a camera and a radar sensor. At step 405, the electronic processor 200 receives an image from a camera (for example, the camera 120). At step 410, the electronic processor 200 determines a portion of the image including an object using object recognition techniques, such as CNNs. Once the portion of the image including the object is identified, the electronic processor 200 crops the image, so that a portion of the image, for example, the majority of the image, depicts the object. At step 415, the electronic processor 200 also receives radar data from the radar sensor 125. At step 420, the electronic processor 200, executing the radar data processing software 225, determines radar data from the radar sensor 125 associated with the object detected in the image from the camera 120. For example, the radar sensor 125 may receive radar data associated with a plurality objects in the surrounding environment of the vehicle 105. As noted above, the fields of view of the camera 120 and the radar sensor 125 are aligned. To determine the radar data from the radar sensor 125 that is associated with only the object detected in the image, the electronic processor 200 determines the location of the detected image in the field of view of the camera 120 and matches the determined location in the field of view of the camera 120 to a location in the field of view of the radar sensor 125. The radar data received from the location in the field of view of the radar sensor 125 is the radar data that is associated with the object detected in the image from the camera 120.

Figure 5:
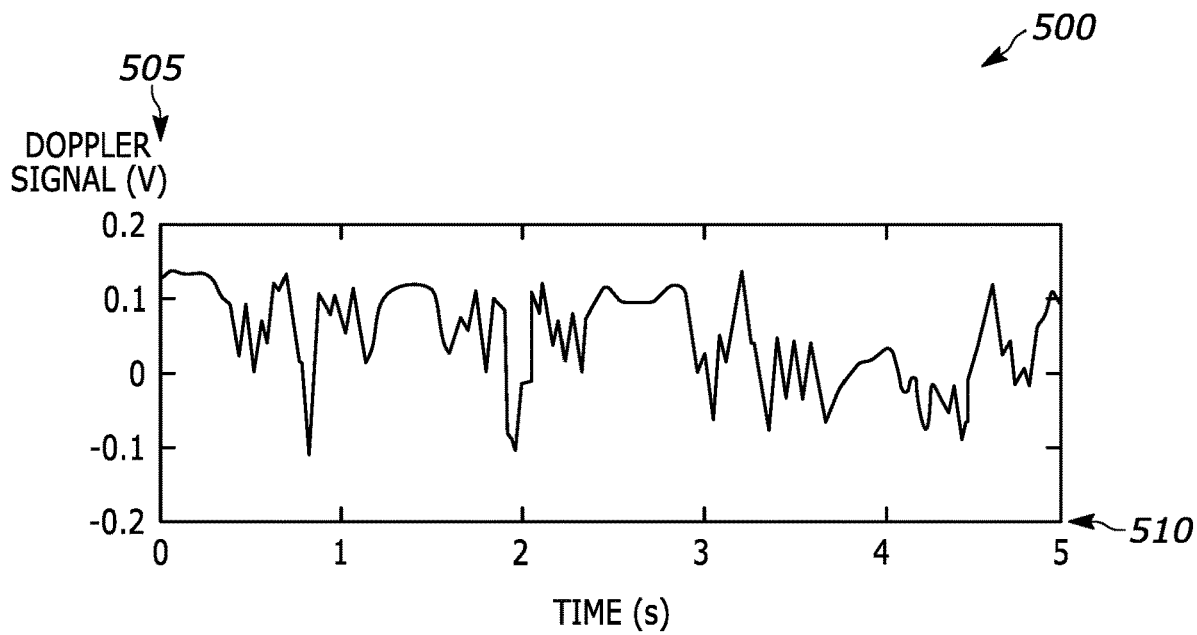
FIG. 5 is an illustration of radar data and its corresponding time-frequency image according to one embodiment
Figure 5:
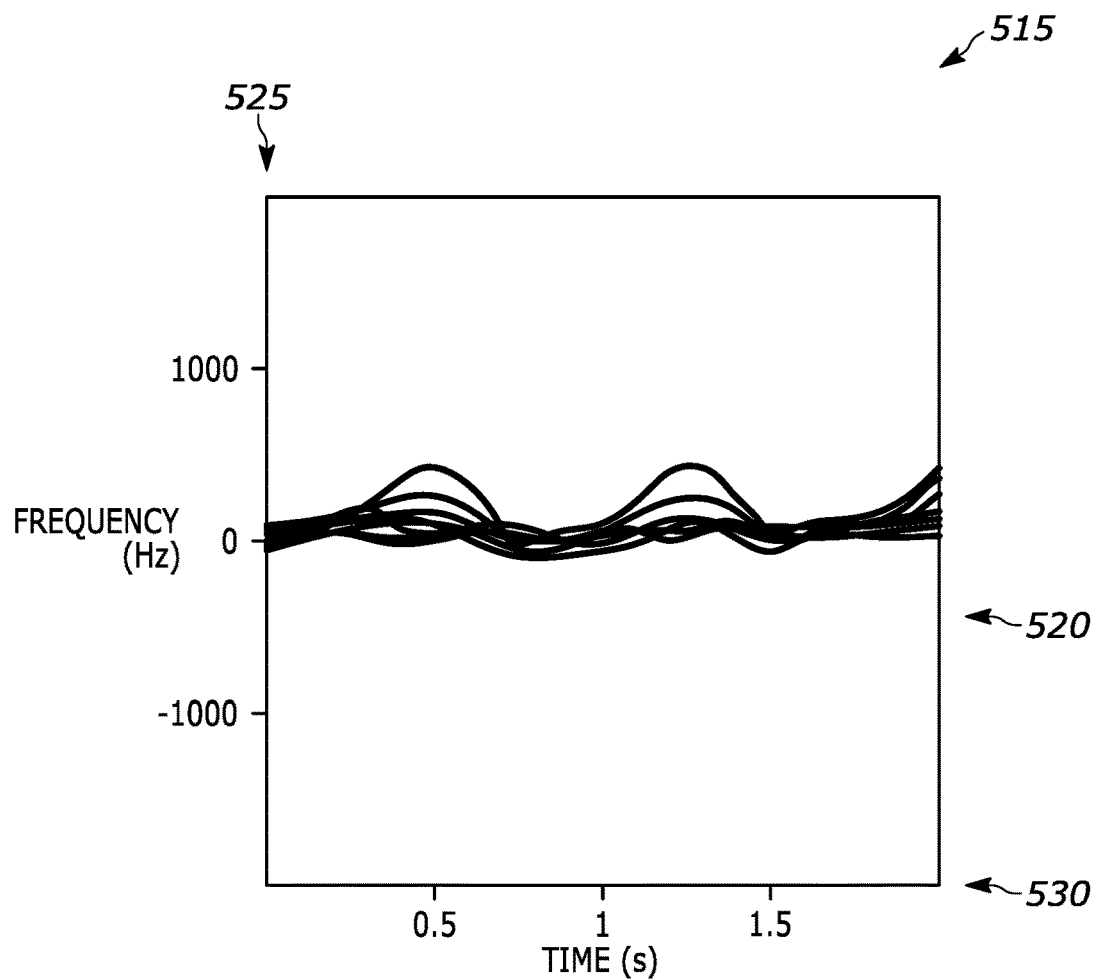

At step 425, the electronic processor 200 converts the radar data associated with the object to a time-frequency image. For example, the electronic processor 200 converts the radar data to an image by applying a time-frequency analysis technique, such as a short-time Fourier transform, a wavelet transform, a bilinear time-frequency distribution function, a modified Wigner distribution function, Hilbert-Huang transform, or the like to the radar data associated with the object. FIG. 5 is an example illustration of the conversion of the radar data to an image. Chart 500 of FIG. 5 illustrates the radar data associated with an object in the image. As shown in the chart 500, in one example the radar data is a Doppler signal (measured on the y-axis 505 of the chart 500) received over time (measured on the x-axis 510 of the chart 500). Chart 515 illustrates a time-frequency image 520 that results from applying a time-frequency analysis technique to the radar data included in the chart 500. The y-axis 525 of the chart 515 represents frequency (measured in Hertz) and the x-axis 530 of the chart 515 represents time (measured in seconds).

Figure 6:
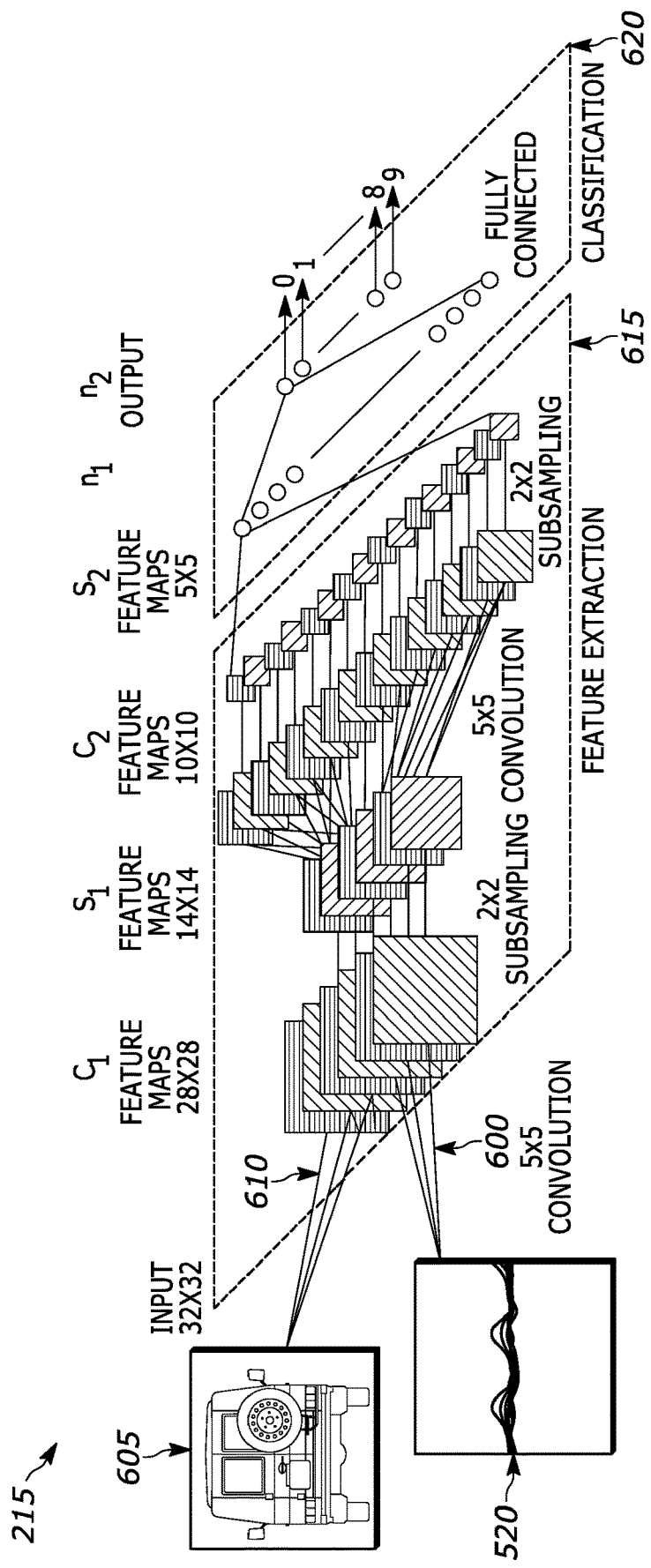
FIG. 6 is a block diagram of a neural network used to perform the method of FIG. 4 according to one embodiment.

At step 430, the electronic processor 200 analyzes the time-frequency image and the image of the object to classify the object and an activity being performed by the object. In some embodiments, the electronic processor 200 uses the neural network 215 to simultaneously analyze the image of the object and the time-frequency image, although simultaneous analysis is not required in all instances. FIG. 6 illustrates one example embodiment of performing the analysis of the image of the object and the time-frequency image. In the example illustrated in FIG. 6, the neural network 215 is illustrated as a convolutional neural network with two input channels. In the example illustrated in FIG. 6, the time-frequency image 520 is feed to the neural network 215 via a first channel 600 and the image 605 of the object is fed to the neural network 215 via a second channel 610.

The neural network 215 has a plurality of layers including feature extraction layers 615 and a classification layer 620. There are two types of feature extraction layers 615—convolutional layers and pooling or sub-sampling layers. Each convolutional layer applies filters to the image 605 and the time-frequency image 520. In certain embodiments, a filter is a matrix of weight values. The weight values of the filters are set by training the neural network 215. Sub-sampling layers reduce the size of the images being processed by the neural network 215. A sub-sampling layer creates a smaller image from a larger image by creating the smaller image with pixels that represent groups of pixels in the larger image. For example, a maximum pooling layer uses a pixel, with the largest value of amongst pixels in a group of pixels in the larger image, to represent the group of pixels in the smaller image. In another example, an average pooling layer uses a pixel, assigned an average of the values of each pixel in a group of pixels in the larger image, to represent the group of pixels in the smaller image. The classification layer 620 is responsible for using the extracted features of the image 605 and the time-frequency image 520 to classify the object and the action being performed by the object.

In some embodiments, once the object and the activity being performed by the object is classified, the electronic processor 200 utilizes the vehicle control system 110 to perform an automated driving function based on the classification of the object and activity associated with the object. In one example, if the object is classified as a bicyclist and the action that the bicyclist is performing is moving parallel to the vehicle 105 on the shoulder of the road at a slower rate than the vehicle 105, the electronic processor 200 may utilize the brakes 305 to slow the vehicle 105 down as the vehicle 105 passes the bicyclist, utilize the steering system 300 to give the bicyclist a wide berth, or both. In another example, if the object is classified as a pedestrian and the action that the pedestrian is performing is standing at the edge of the road that the vehicle 105 is traveling on, the electronic processor 200 may utilize the brakes 305 to slow the vehicle 105 down as the vehicle 105 passes the pedestrian.

In some embodiments, the classifications of multiple objects in the surrounding environment of the vehicle 105 and the classifications of the actions that the objects are performing are utilized by the electronic processor 200 to determine an autonomous driving action to perform. For example, if a first object is a bicyclist moving parallel to the vehicle 105 on the left-hand side of the vehicle 105 and a second object is a vehicle moving parallel to the vehicle 105 on the right-hand side of the vehicle 105, the electronic processor 200 may determine that the vehicle 105 should slow down as the vehicle 105 passes the bicyclist but should not cross into the lane on the right-hand side of the vehicle 105 to give the bicyclist a wide berth. This prevents the vehicle 105 from colliding with the vehicle traveling parallel to the vehicle 105 on the right-hand side of the vehicle 105.

In some embodiments, the electronic processor 200, when executing the object detection software 220, detects multiple objects in an image received from the camera 120. In this scenario, the electronic processor 200 may perform steps 415-430 of the method 400 for each object detected in the image from the camera 120. In some embodiments, the system 100 includes multiple pairs of cameras and radar sensors, each pair having a different field of view and electronic processor 200 receives images and radar data from each pair. The data received from different pairs of cameras and radar sensors may be analyzed sequentially or in parallel. For example, each pair of cameras and radar sensors in the system 100 may be associated with an electronic controller similar to the electronic controller 115 illustrated in FIG. 2 and each electronic controller may perform the method 400 using image and radar data received from its associated camera and radar sensor pair.

In the foregoing specification, specific embodiments and examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various features, advantages, and embodiments are set forth in the following claims.

What is claimed is:

1. A system for performing object and activity recognition based on data from a camera and a radar sensor, the system comprising:
a camera;
a radar sensor; and
an electronic processor, the electronic processor configured to
receive an image from the camera;
determine a portion of the image including an object;
receive radar data from the radar sensor;
determine radar data from the radar sensor associated with the object in the image from the camera;
convert the radar data associated with the object to a time-frequency image; and
analyze the time-frequency image and the image of the object to classify the object and an activity being performed by the object.

2. The system according to claim 1, wherein the camera, radar sensor, and electronic processor are included in a vehicle and the object is located in a surrounding environment of the vehicle and impacts movement of the vehicle.

3. The system according to claim 1, wherein the electronic processor is configured to determine a portion of the image including an object by determining the location of the object in the image using machine learning techniques and cropping the image so that a majority of the image depicts the object.

4. The system according to claim 1, wherein the electronic processor is configured to convert the radar data to a time-frequency image by applying a time-frequency analysis technique to the radar data.

5. The system according to claim 1, wherein the electronic processor is configured to analyze the image associated with the radar data and the image of the object simultaneously to classify the object and an activity being performed by the object using a deep neural network.

6. The system according to claim 5, wherein the deep neural network includes two input channels and the image of the radar data is input to the deep neural network via a first channel and the image from the camera is input to the deep neural network via a second channel.

7. The system according to claim 5, wherein the deep neural network is trained to classify the object and the activity using a plurality of pairs of images, a first image in each pair of images is an image, from a camera, of an object and the a second image is a time-frequency image associated with the object.

8. The system according to claim 1, wherein the electronic processor is further configured to perform an automated driving function based on the classification of the object and the activity being performed by the object.

9. The system according to claim 1, wherein a center point of a field of view of the camera is aligned with a center point of a field of view of the radar sensor.

10. A method for performing object and activity recognition based on data from a camera and a radar sensor, the method comprising:
receiving, with an electronic processor, an image from a camera;
determining, with the electronic processor, a portion of the image including an object;
receiving, with the electronic processor, radar data from a radar sensor;
determining, with the electronic processor, radar data from the radar sensor associated with the object in the image from the camera;
converting, with the electronic processor, the radar data associated with the object to a time-frequency image; and
analyzing, with the electronic processor, the time-frequency image and the image of the object to classify the object and an activity being performed by the object.

11. The method according to claim 10, wherein the camera, radar sensor, and electronic processor are included in a vehicle and the object is located in a surrounding environment of the vehicle and impacts movement of the vehicle.

12. The method according to claim 10, wherein determining a portion of the image including an object includes
determining the location of the object in the image using machine learning techniques; and
cropping the image so that a majority of the image depicts the object.

13. The method according to claim 10, wherein converting, with the electronic processor, the radar data associated with the object to a time-frequency image includes applying a time-frequency analysis technique to the radar data.

14. The method according to claim 10, wherein analyzing, with the electronic processor, the time-frequency image and the image of the object to classify the object and an activity being performed by the object includes analyzing, using a deep neural network, the time-frequency image and the image of the object simultaneously to classify the object and an activity being performed by the object.

15. The method according to claim 14, wherein the deep neural network includes two input channels and the image of the radar data is input to the deep neural network via a first channel and the image from the camera is input to the deep neural network via a second channel.

16. The method according to claim 14, wherein the deep neural network is trained to classify the object and the activity using a plurality of pairs of images, a first image in each pair of images is an image, from a camera, of an object and the a second image is a time-frequency image associated with the object.

17. The method according to claim 10, the method further comprising performing an automated driving function based on the classification of the object and the activity being performed by the object.

18. The method according to claim 10, wherein a center point of a field of view of the camera is aligned with a center point of a field of view of the radar sensor.

\* \* \* \* \*